US006716898B2

(12) United States Patent
Weaver et al.

(10) Patent No.: US 6,716,898 B2
(45) Date of Patent: Apr. 6, 2004

(54) AMBER POLYESTER COMPOSITIONS FOR PACKAGING FOOD AND BEVERAGES

(75) Inventors: Max Allen Weaver, Kingsport, TN (US); Horst Clauberg, North Wales, PA (US); Samuel David Hilbert, Jonesborough, TN (US); Dale Milton Blakely, Kingsport, TN (US); Sara Stanley Wells, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 15 days.

(21) Appl. No.: 10/137,144

(22) Filed: May 1, 2002

(65) Prior Publication Data

US 2002/0177673 A1 Nov. 28, 2002

Related U.S. Application Data

(60) Provisional application No. 60/292,144, filed on May 18, 2001.

(51) Int. Cl.⁷ .............................................. C08L 67/02
(52) U.S. Cl. ..................... 524/88; 525/10; 525/445; 528/288; 528/290; 528/292
(58) Field of Search ............... 524/88; 525/10, 525/445; 528/288, 290, 292

(56) References Cited

U.S. PATENT DOCUMENTS

| | | |
|---|---|---|
| 4,025,492 A | 5/1977 | Binsack et al. |
| 4,136,089 A | 1/1979 | Bier et al. |
| 4,176,224 A | 11/1979 | Bier et al. |
| 4,238,593 A | 12/1980 | Duh |
| 4,359,570 A | 11/1982 | Davis et al. |
| 4,390,570 A | 6/1983 | Rehberg |
| 4,617,373 A | 10/1986 | Pruett et al. |
| 4,617,374 A | 10/1986 | Pruett et al. |
| 4,745,173 A | 5/1988 | Weaver et al. |
| 5,650,481 A | 7/1997 | Yau et al. |
| 5,668,243 A | 9/1997 | Yau et al. |
| 5,688,899 A | 11/1997 | Strand et al. |
| 5,744,571 A | 4/1998 | Hilbert et al. |

FOREIGN PATENT DOCUMENTS

EP 0747036 A2 11/1996

OTHER PUBLICATIONS

PCT International Search Report.
Biundo, Vito, "Specifying Amber Glass Color in Order to Protect Beer from Developing Lightstruck Character", *Master Brewers Association of the Americas Technical Quarterly.* vol. 37, No. 2, pp. 233–238.
Templar, J., Arrigan, K., and Simpson, W.J., Formation, Measurement and Significance of Lightstruck Flavor in Beer: A Review, *Brewer's Digest.* vol. 70, No. 5, pp. 18–25 (1995).
Wilfong, R.E., "Linear Polyesters", *Journal of Polymer Science*, vol. 54, pp. 385–410 (1961).

*Primary Examiner*—Patricia A. Short
(74) *Attorney, Agent, or Firm*—Dennis V. Carmen; Bernard J. Graves, Jr.

(57) ABSTRACT

Disclosed are amber polyester compositions suitable for packaging food and beverages wherein the compositions significantly absorbs light of wavelengths shorter than about 550 nm which is achieved by a combination of several colorants, most of which are copolymerized into the polyester.

8 Claims, 3 Drawing Sheets

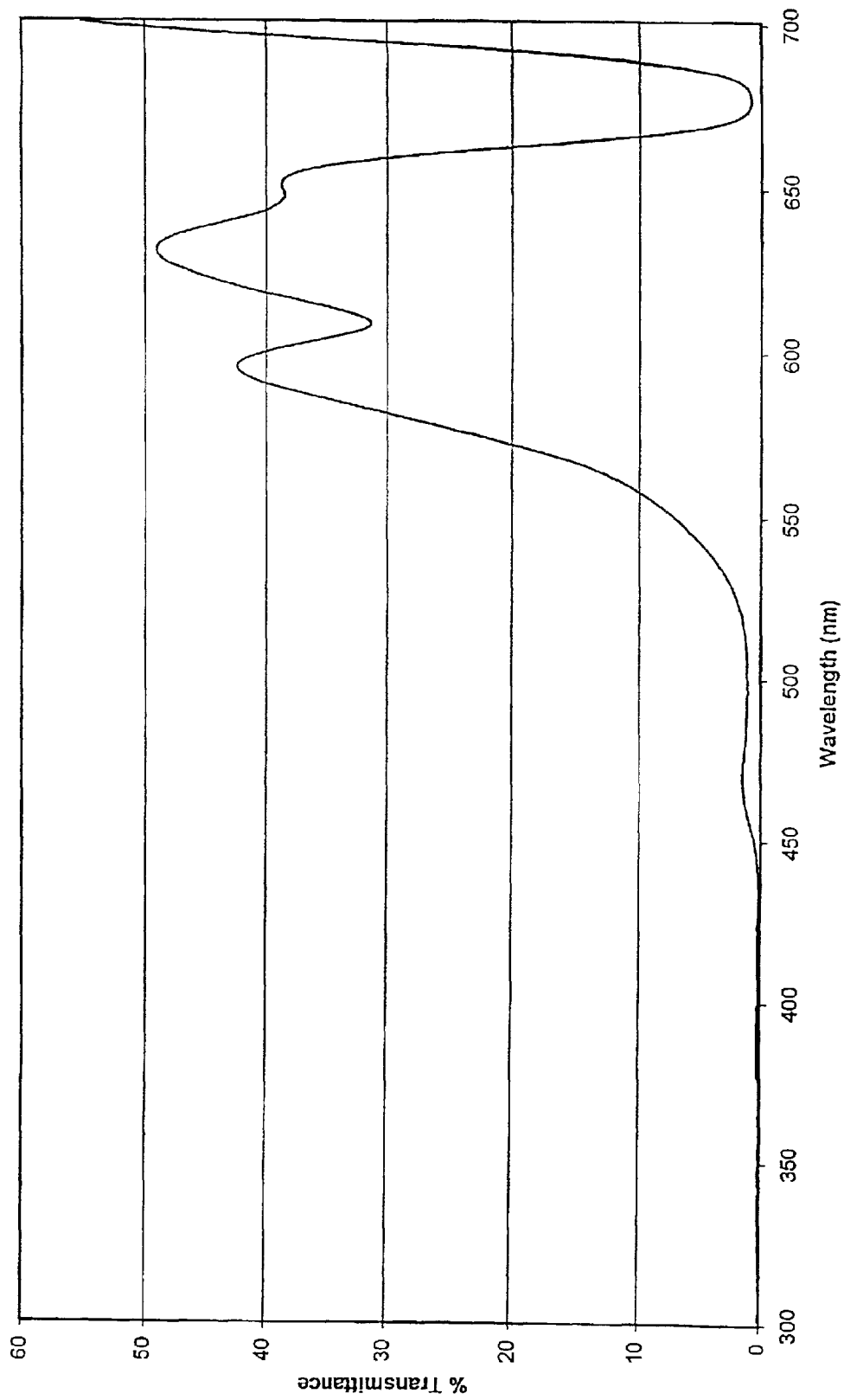
Figure I
Transmission Spectrum of the Amber Polyester of Example 1
(15 mil Film)

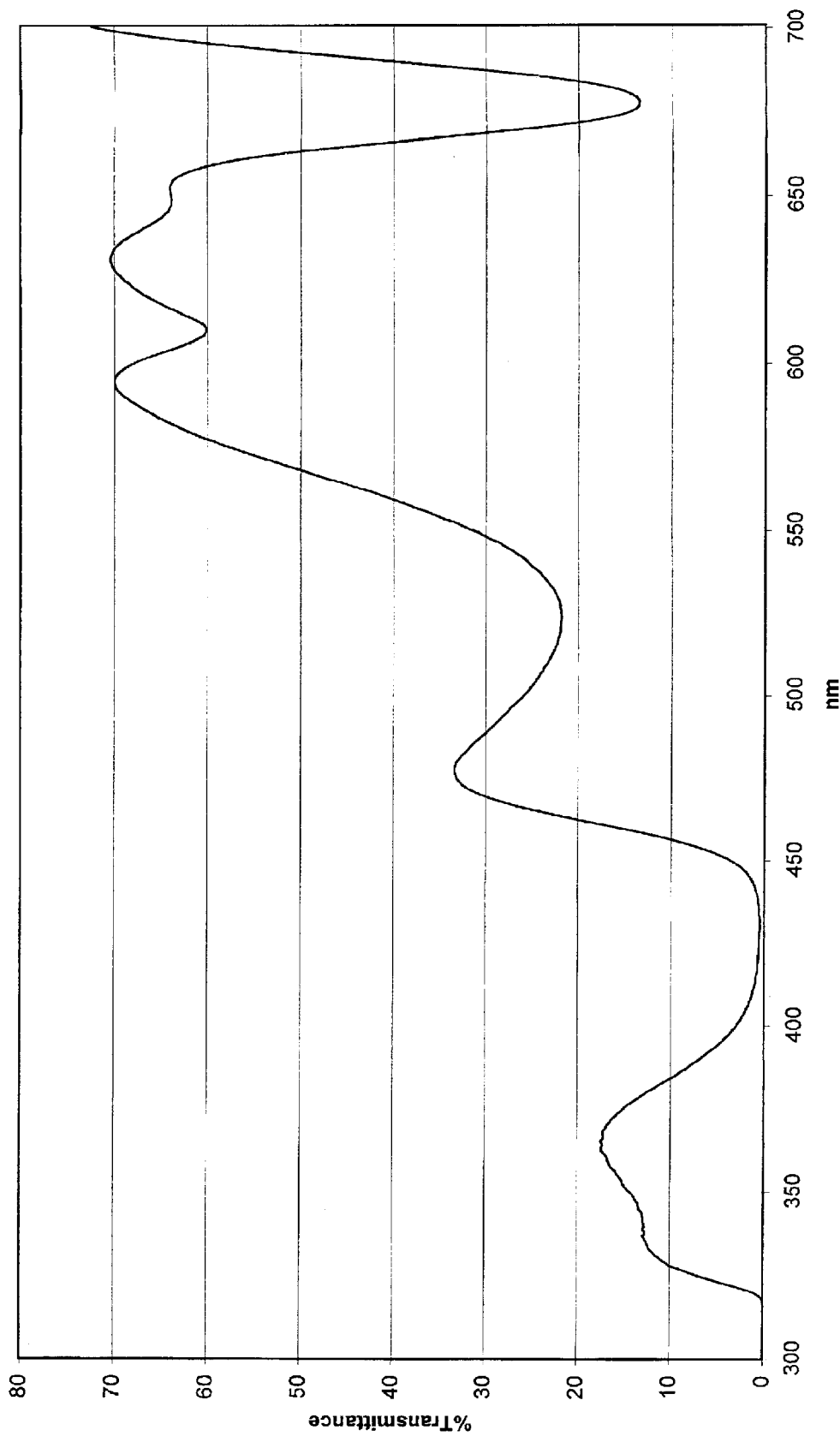
Figure II
Transmission Spectrum of Amber Polyester of Comparative Example 1 (15 mil Film)
US Patent 4,617,373, Ex. 761

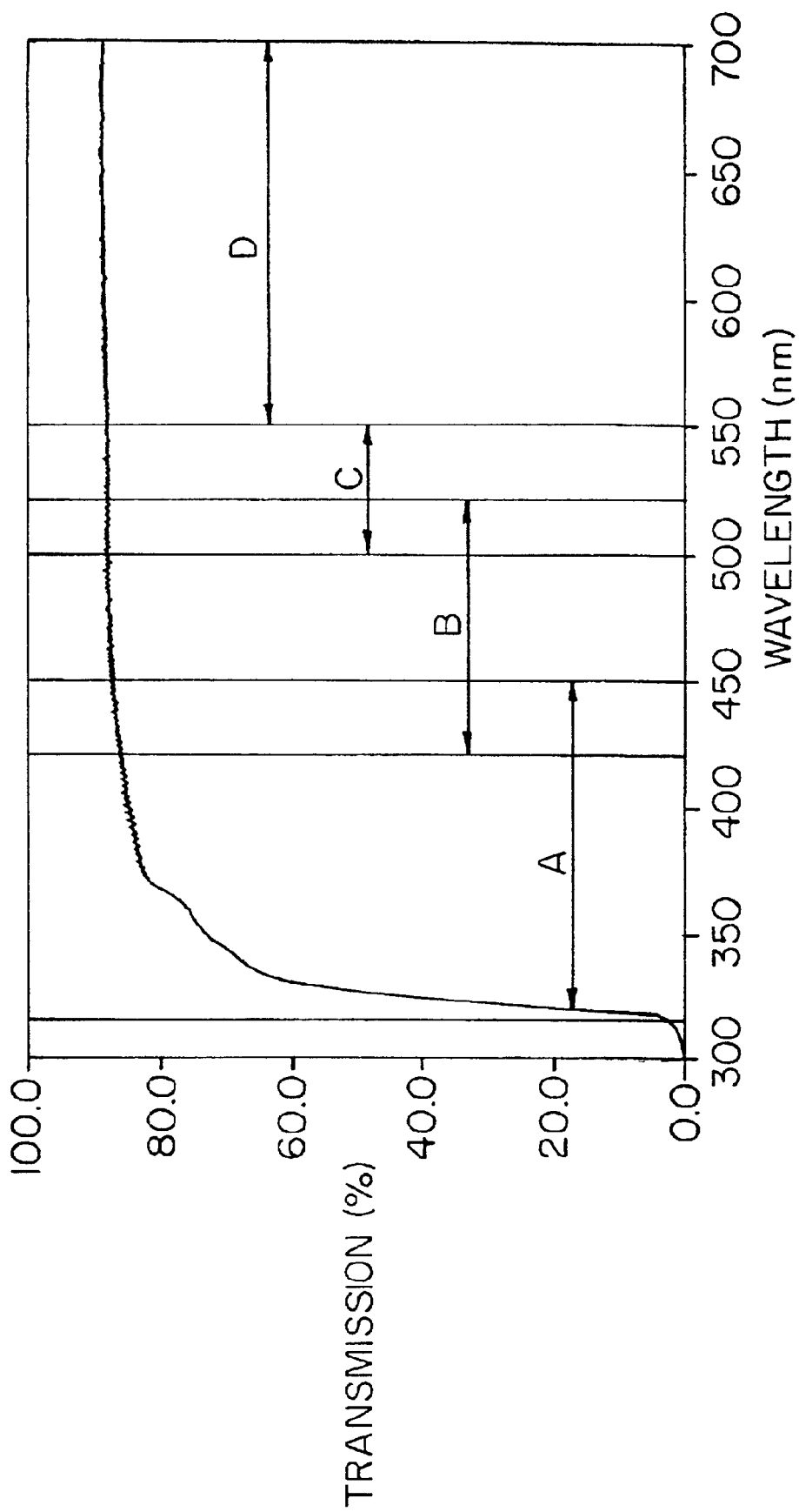
Fig. III

AMBER POLYESTER COMPOSITIONS FOR PACKAGING FOOD AND BEVERAGES

CROSS REFERENCE TO RELATED APPLICATION

This application claims the benefit of U.S. Provisional Application Serial No. 60/292,144 filed May 18, 2001.

FIELD OF THE INVENTION

This invention concerns amber polyester compositions, which are suitable for packaging food and beverages wherein blockages of ultraviolet and visible light is important. More specifically, this invention is concerned with providing an amber polyester composition that significantly absorbs light of wavelengths shorter than about 550 nm, which is achieved by a novel combination of several colorants, most of which are copolymerized into the polyester.

BACKGROUND OF THE INVENTION

The packaging of beverages and food in plastic containers places a particularly challenging set of technical specifications on the polymer from which a container is produced. The container must prevent an excessive loss of carbonation through the walls of the container and must limit the ingress of oxygen to a very low level. Also, with some foods and beverages it is very desirable to protect them from ultraviolet light and some wavelengths of visible light.

Particularly problematic is providing suitable polyester packaging for beer. Although a few beers are specifically treated to be resistant to light-induced changes, most beers are highly sensitive to light. As a result, the container or package must block the damaging portions of the light spectrum. The light-induced changes that occur to produce the characteristic light-struck or "skunky" flavor are well documented, for example by J. Templar, K. Arrigan, and W. J. Simpson, *Brewer's Digest*, Vol. 70, no. 5, pages 18–25 (1995) and references therein. It is generally accepted that not only ultraviolet light but also visible light of wavelengths shorter than about 550 nm are responsible for the formation of the light-struck flavor (Vita Biundo, Master Brewers Association of the Americas *Technical Quarterly*, Vol 37, no. 2, pp. 233–238. and J. Templar, K. Arrigan, and W. J. Simpson, Brewer's Digest, Vol 70, No. 5, pp 18–25 (1995).). It is therefore desirable to produce a polymer for packaging beer that blocks a large portion of ultraviolet and visible light with wavelengths of less than 550 nm from reaching the beer.

Polyesters having colorants and other light-absorbing compounds copolymerized therein are well-known. U.S. Pat. No. 4,617,373 discloses the use of certain copolymerizable methine dyes at concentration from 1 to 5,000 ppm in condensation polymers including an amber poly(ethylene terephthalate) formulation. However, the light protection provided by this formulation falls far short of the light protection requirements of most beers. U.S. Pat. No. 4,617,374 discloses polyester compositions comprising poly(ethylene terephthalate having copolymerized therein certain methine UV-absorbing compounds, but does not mention the use of the methine UV-absorbing compounds to produce a light protecting amber colored polyester.

U.S. Pat. No. 4,745,173 discloses the use of 1 to 20,000 ppm of colorants having the 2,5-diarylaminoterephthalate chromophore. The '173 patent mentions the use of such colorants in the production of amber colored polyester but does not mention any specific formulations that meet the light protection requirements of most beers. U.S. Pat. No. 4,390,570 discloses the use of certain anthraquinone dyes as colorants in polyesters for food and beverage packaging. Again, the possible use of such dyes in an amber formulation is mentioned, but no specific combination of colorants for the production of an amber polyester suitable for packaging beer is given.

BRIEF SUMMARY OF THE INVENTION

The present invention provides an amber polyester composition that significantly absorbs light of wavelengths shorter than about 550 nm and is particular suitable for the production of containers or packaging material intended for the packaging of beer. Accordingly, the present invention provides a molding grade amber composition comprising a thermoplastic polyester having copolymerized therein or reacted therewith residues of at least two compounds of formula I at least one compound of formula II and at least one compound of formula III:

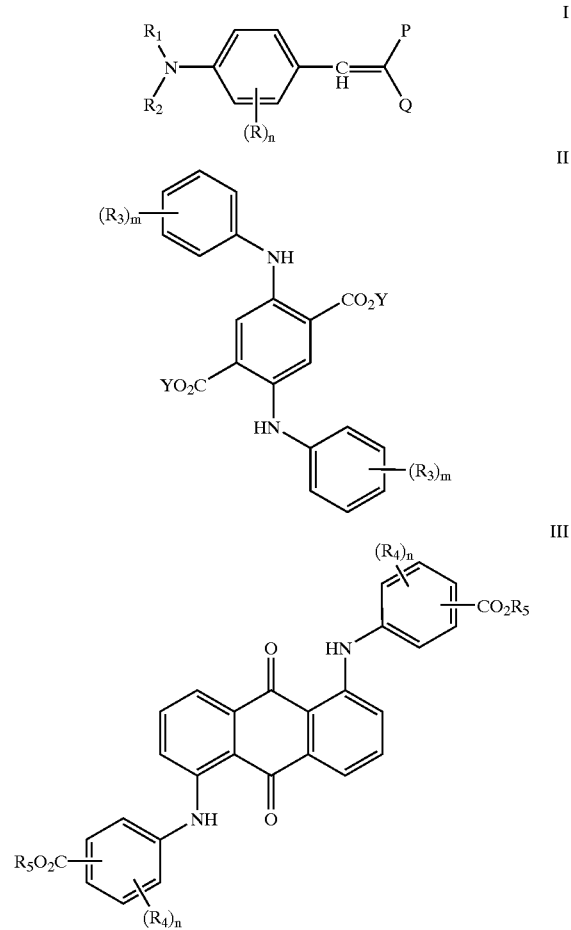

wherein:
R is selected from hydrogen, fluorine, chlorine, bromine, trifluoromethyl, $C_1$–$C_6$-alkyl and $C_1$–$C_6$-alkoxy;
$R_1$ and $R_2$ are independently selected from $C_1$–$C_8$-alkyl; $C_1$–$C_8$-alkyl substituted with one or two groups selected from hydroxy, cyano, $C_1$–$C_6$-alkoxy, $(OCH_2CH_2)_{1-3}$—O $C_1$–$C_6$-alkoxy, carboxy, halogen, $C_5$–$C_7$-cycloalkyl, $C_2$–$C_6$-alkoxycarbonyl, $C_2$–$C_6$-alkanoyloxy, aroyloxy, $C_2$–$C_6$-alkoxycarbonyloxy, heteroarylthio, aryloxy, arylthio, N-arylcarbamyloxy and aryl; $C_3-C_8$-alkenyl; $C_5-C_7$-cycloalkyl; aryl; $R_1$ and $R_2$ in combination may be a single group such as pentamethylene, ethyleneoxyethylene or ethylenesulfonylethylene; $R_1$ and $(R)_n$ in combination may be a trimethylene group optionally substituted with one or two $C_1-C_8$-alkyl groups which with the benzene ring to which R is attached forms a 1,2,3,4-tetrahydroquinoline radical; or $R_1$ may represent the radical:

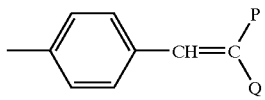

wherein P and Q are defined below;

P and Q are independently selected from cyano, aryl, $C_2-C_6$-alkoxycarbonyl, $C_1-C_6$-alkylsulfonyl, arylsulfonyl, carbamyl, N—$C_1-C_6$-alkylcarbamyl, N-arylcarbamyl and heteroaryl;

$R_3$ is selected from hydrogen, $C_1-C_6$-alkyl, $C_1-C_6$-alkoxy, aryl, cyclohexyl, aryloxy, arylthio, $C_2-C_6$-alkoxycarbonyl, trifluoromethyl, hydroxy, $C_2-C_6$-alkanoylamino, aroylamino and halogen;

Y is selected from hydrogen, $C_1-C_6$-alkyl, aryl, $C_5-C_7$-cycloalkyl, —$CH_2$—1,4-cyclohexylene—$CH_2OH$, $(CH_2CH_2O)_{1-2}$ $CH_2CH_2OH$; $C_3-C_7$-alkenyl, and furfuryl;

$R_4$ is selected from hydrogen, $C_1-C_6$-alkyl, $C_1-C_6$-alkoxy or halogen;

$R_5$ is selected from hydrogen or one of the groups which Y may represent;

m is 1, 2, or 3; and n is 1 or 2;

provided that at least one polyester reactive group be present on the compound of formulas I, II and III; and wherein the concentration of the copolymerized compounds is sufficient that a film of the polyester composition having a thickness of from about 25 to 1016 microns (about 1 to 40 mil) transmits no more than an average of about 3% of ultraviolet and visible light over the wavelength range from about 300 to 450 nm, no more visible light than an average of about 7% over the 450 to 500 nm wavelength range and no more visible light than an average of about 15% over the range of from about 500 to 550 nm; and wherein about 50–200 ppm of copper phthalocyanine (C.I. Pigment Blue 15) blue colorant is admixed in the thermoplastic polyester. The reference herein to copper phthalocyanine includes C.I. Pigment Blue 15, 15:1, 15:2 and 15:3 crystalline forms.

The amber colored polyesters of the invention are useful for forming bottles or other containers for packaging food and beverages, particularly beer. The coloration of the polyester is such that a substantial portion of ultraviolet and visible wavelengths shorter than about 550 nm are prevented from reaching the contents of the container. Through the process of copolymerization, the colorants having formulas I, II and III are rendered highly resistant to extraction by foods and beverages. The polyester is not limited to use in containers that consist of only a single layer of such a polyester, but can also be used in one or more layers of a multi-layer container. If desired, the polyester can be admixed with other materials. Such other materials may be recycled polyester or substances that impart gas barrier or oxygen scavenging properties.

BRIEF DESCRIPTION THE DRAWINGS

FIG. I graphically illustrates transmission spectrum of the film made by Example 1 showing the blockage of UV invisible light over a wavelength of from 320–550 nanometers.

FIG. II graphically illustrates the UV-visible light transmission spectrum for the film made in comparative Example 1.

FIG. III graphically illustrates a division of the light spectrum between four distinct regions labeled A,B,C and D.

DETAILED DESCRIPTION

The polyester polymer useful in the present invention is not critical and may be any polyester useful for forming containers. Preferably, the polyester comprises:

(1) diacid residues comprised of at least about 50 mole percent, preferably at least 85 mole percent, terephthalic acid residues; and (2) diol or glycol residues comprising at least about 50 mole percent, preferably at least 85 mole percent, ethylene glycol residues.

In an additional preferred embodiment, the polyester comprises:

(1) diacid residues comprised of at least about 50 mole percent, preferably at least 85 mole percent, 2,6-naphthalenedicarboxylic acid residues; and (2) diol or glycol residues comprising at least about 50 mole percent, preferably at least 85 mole percent, ethylene glycol residues.

The dicarboxylic acid components (or diacid residues) of the polyester may optionally be modified by one or more dicarboxylic acids other than terephthalic or 2,6-naphthalenedicarboxylic acids or their synthetic equivalents such as dimethyl terephthalate or dimethyl 2,6-naphthalenedicarboxylate. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids having 8 to 12 carbon atoms. Examples of dicarboxylic acids to be included with terephthalic acid and/or naphthalenedicarboxylic acid include, but are not limited to: phthalic acid, isophthalic acid, cyclohexanedicarboxylic acid, cyclohexanediacetic acid, diphenyl 4,4'-dicarboxylic acid, succinic acid, glutaric acid, adipic acid, azelaic acid, sebacic acid, and the like. Polyesters may be prepared with two or more of the above dicarboxylic acids. The polyesters may be prepared from the dicarboxylic acids, esters and acid halides thereof, and, in some cases, from their anhydrides.

In addition, the diol component optionally may be modified with one or more different diols other than ethylene glycol. Such additional diols include, but are not limited to, cycloaliphatic diols preferably having 6 to 20 carbon atoms or aliphatic diols having 3 to 20 carbon atoms. Examples of such diols to be included with ethylene glycol are: diethylene glycol, triethylene glycol, 1,4-cyclohexanedimethanol, propane-1,3-diol, butane-1,2-diol, butane-1,4-diol, pentane-1,5-diol, hexane-1,6-diol, 3-methyl-2,4-pentanediol, 2-methyl-1,3-pentanediol, 2,2,4-trimethyl-1,3-pentanediol, 2-ethyl-1,3-hexanediol, 2,2-diethyl-1,3-propanediol, 1,3-hexanediol, 1,4-bis(2-hydroxyethoxy)benzene, 2,2-bis-(4-hydroxycyclohexyl)-propane, 2,4-dihydroxy-1,1,3,3-tetramethylcyclobutane-2,2-bis-(3-hydroxyethoxyphenyl)-propane, and 2,2-bis-(4-hydroxypropoxyphenyl)-propane. The polyesters may be prepared with two or more of the above diols.

The polyethylene terephthalate or polyethylene naphthalenedicarboxylate resins also may contain small amounts of trifunctional or tetrafunctional comonomers such as trimellitic anhydride, trimethylolpropane, pyromellitic dianhydride, pentaerythritol, and other polyester forming polyacids or polyols generally known in the art.

Polyethylene terephthalate and polyethylene naphthalenedicarboxylate polyesters of the present invention can be prepared by conventional polycondensation procedures well-known in the art. Such processes include direct condensation of the dicarboxylic acid(s) with the diol(s) or by ester interchange using one or more dialkyl dicarboxylates with the diol(s). For example, a dialkyl terephthalate such as dimethyl terephthalate is ester interchanged with the diol(s) at elevated temperatures in the presence of a catalyst. The polyester may also be subjected to solid state polymerization methods. Polyethylene naphthalenedicarboxylate polyesters also may be prepared by known polycondensation procedures.

The polyesters may be prepared according to polyester forming conditions well known in the art. For example, a mixture of one or more dicarboxylic acids, preferably aromatic dicarboxylic acids, or ester forming derivatives thereof, and one or more diols may be heated in the presence of esterification and/or polyesterification catalysts at room temperatures in the range of about 150 to 300° C. and pressures of atmospheric to about 0.2 Torr (0.2 mm Hg). A preferred temperature range for a polyester condensation is about 260 to about 300° C. Normally, the dicarboxylic acid or derivative thereof is esterified or transesterified with the diol(s) at atmospheric pressure and at a temperature at the lower end of the specified range. Polycondensation then is affected by increasing the temperature and lowering the pressure while excess diol is removed from the mixture.

Typical catalysts or catalyst systems for polyester condensation are well-known in the art. For example, catalysts disclosed in U.S. Pat. Nos. 4,025,492; 4,136,089; 4,176,224; 4,238,593; 5,650,481; 5,668,243; 5,688,899; and 5,744,571 may be used to prepare the preparation of the polyesters. Further, R. E. Wilfong, *Journal of Polymer Science*, 54 385 (1961) sets forth typical catalysts which are useful in polyester condensation reactions.

The preferred polyesters referred to herein include linear, thermoplastic, crystalline or amorphous polyesters produced by conventional polymerization techniques from one or more diols and one or more dicarboxylic acids. The polyesters normally are molding or fiber grade and have an inherent viscosity (I.V.) of about 0.4 to 1.2 dL/g, preferably about 0.6 to 0.9 dL/g, measured at 25° C. using 0.50 g of polyester per 100 ml of solvent consisting of 60 weight percent phenol and 40 weight percent tetrachloroethane.

Many other ingredients also may be added to the compositions of the present invention to enhance the performance properties of the polyesters. For example, crystallization aids, impact modifiers, surface lubricants, denesting agents, stabilizers, antioxidants, metal deactivators, nucleating agents, mold releases, platelet particles, oxygen scavenging compositions, oxygen scavenging catalysts, and the like can be included. All of these additives and many others and their use are well known in the art and do not require extensive discussion. Therefore, only a limited number will be referred to, it being understood that any of these compounds can be used so long as they do not hinder the present invention from accomplishing its objectives.

To adequately protect beer from light-induced degradation, the container or bottle prepared from the amber-colored polyester compositions of the present invention should transmit no more than an average of about 3% of the light over the wavelength range from about 300 to 450 nm, no more than an average of about 7% from about 450 to 500 nm and no more than an average of about 15% from about 500 to 550 nm. The percentage of UV-visible light transmitted may be determined by using available UV-visible spectrometers such as a Perkin-Elmer Lambda 4B, Lambda 6 or Lambda 20 UV-visible spectrometers. More preferably, the amber-colored polyester compositions of the present invention transmit no more than an average of about 1% of the light over the wavelength range of from about 300 to 450 nm, no more than an average of about 3% from about 450 to 500 nm and no more than an average of about 10% from about 500 to 550 nm. This amount of light blockage is achieved for a layer or container wall thickness of the polymer that may range from about 25 to 1270 microns (about 1 to 50 mil), more preferably from about 51 to 635 microns (about 2 to 25 mil), and most preferably from about 76 to 432 microns (about 3 to 17 mil). The polymer can provide this light protection in a container made from a single layer or a bottle consisting of multiple layers of the polyester composition. In the case of a multi-layer bottle, the colored polyester composition may be used in one, some or all of the layers. Additionally, the polyester composition may be admixed with other materials without deviating from the present invention. Such materials may be other polymers, such as recycled plastic, polyamides, poly(vinylalcohol), polyolefins, and other thermoplastics.

The specific colorant formulation of the present invention uses the intrinsic light blocking characteristics of the terephthalic acid residues of the polyester to block those wavelengths shorter than about 315 nm or, in the case of a polyester containing significant amounts of naphthalenedicarboxylic residues, those wavelengths shorter than about 370 nm.

To describe the combination of light absorbing compounds present in the polyester compositions of the present invention, the light spectrum may be divided into four distinct regions, labeled A, B, C and D as depicted in FIG. III. Region A extends from about 300 to 450 nm, Region B extends from about 420 to 520 nm, Region C extends from about 500 to 550 nm and Region D extends from about 550 to 700 nm. Distinct groups or classes of light-absorbing compounds are used to provide the light absorption requirements in these four regions. Since the light absorption properties of these classes of colorants overlap somewhat, the regions defined above must also overlap to a small extent. Although beer is not damaged by light of wavelengths longer than about 550 nm, some absorption of light in Region D is provided to produce an amber colored polymer. If no significant amount of light is absorbed in Region D, the polymer would be red rather than amber. It should be understood that although amber is currently aesthetically preferred over red for packaging beer, a plastic bottle blow-molded from a polyester composition that provides adequate light protection in Regions A, B and C, but no significant light blockage in Region D, will provide adequate light protection for beer. Such a red polyester composition that provides good light protection in Regions A, B and C, but no substantial absorption in Region D is within the scope of the present invention. FIG. III also provides a transmission spectrum of a 330-micron (13 mil) thick film of a typical poly(ethylene terephthalate) containing no light absorbing compound, which shows that essentially all UV and visible light is transmitted at wavelengths above about 320 nm.

The combination of light absorbing compounds (colorants and UV light absorbers) that is a component of the compositions of the present invention and that substantially blocks the wavelengths shorter than about 550 nm consists of light absorbing molecules that have polyester reactive groups that allow them to be reacted into the polymer chains of the polyester. These light absorbing compounds comprise compounds having formulas I, II and III:

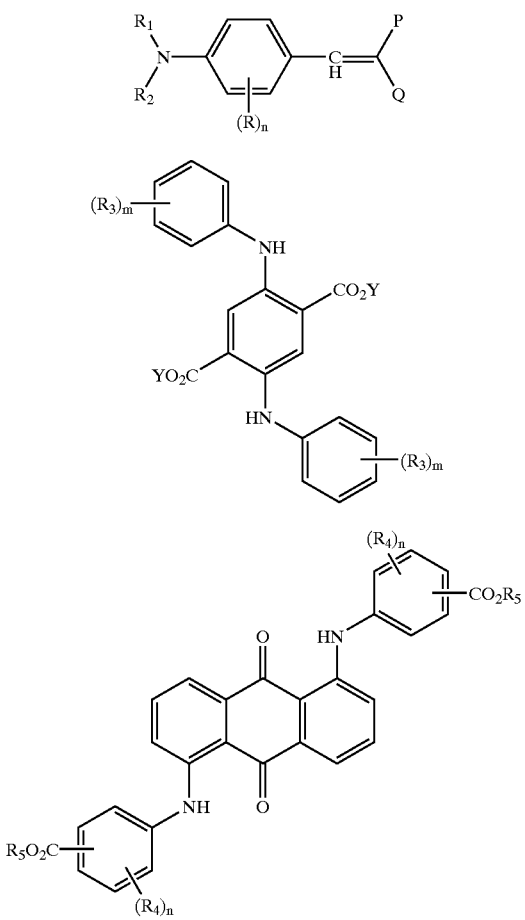

wherein R, $R_1$, $R_2$, P, Q, $R_3$, Y, $R_4$, $R_5$, m and n are defined above and each compound bears or is substituted with at least one polyester reactive group. The residues of the compounds of formula I absorb UV and visible light in Region A, the residues of the compounds of formula II absorb light in Region B, and the residues of the compounds of formula III absorb light in Region C. Through the process of copolymerization or reaction, the colorants are rendered highly resistant to extraction by foods and beverages. The individual colorants may be present in concentration ranging from about 100 ppm to 25,000 ppm and at a total concentration ranging from about 200 ppm to about 20,000 ppm. Preferred ranges are about 150 ppm to 5,000 ppm for individual dyes and about 1000 ppm to about 20,000 ppm for the total concentration of dyes. The polyesters compositions of the present invention also contain about 50–200 ppm of copper phthalocyanine (C.I. Pigment Blue 15) blue colorant admixed in the polyester. The ppm specified herein are parts per million by weight based on the total weight of the amber, molding compositions of the present invention. The polyester compositions are not limited to use in containers that consist of only a single layer of such a polyester, but can also be used in one or more layers of a multi-layer container. If desired, the polyester compositions can be admixed with other materials. Such other materials may be recycled polyester or substances that impart gas barrier or oxygen scavenging properties.

Numerous examples of the benzylidene UV-visible light absorbing compounds of Formula I are described and disclosed in U.S. Pat. No. 4,617,373, particularly in Table I; the orange 2,5-diarylaminoterephthalic acids and esters of Formula II are described and disclosed in U.S. Pat. No. 4,745, 173, particularly Table I; the red anthraquinone compounds of Formula III are described and disclosed in U.S. Pat. No. 4,359,570, particularly in Table II.

In the above definitions of R, $R_1$, $R_2$, P, Q, $R_3$, Y, $R_4$ and $R_5$, "$C_1$–$C_6$-alkyl", "$C_1$–$C_6$-alkoxy", "$C_2$–$C_6$-alkoxycarbonyl", "$C_2$–$C_6$-alkanoyl", "$C_2$–$C_6$-alkoxycarbonyloxy", "$C_2$–$C_6$-alkanoyloxy", "$C_1$–$C_6$-alkylsulfonyl", "$C_1$–$C_6$-alkylcarbamyl" and "$C_2$–$C_6$-alkanoylamino", the alkyl and alkoxy moieties are saturated, straight or branched chain, hydrocarbyl or hydrocarbyloxy radicals having up to about 6 carbon atoms which may optionally be further substituted with one or two groups selected from hydroxy; halogen; cyano; $C_5$–$C_7$-cycloalkyl; —$CO_2H$; —$CO_2R_6$; —$OR_6$; $R_6CO$—; $R_6OCO$—; $R_6S$—; $R_6SO_2$—; $R_6CONH$—; phenyl; phenyl substituted with one or more groups selected from $R_6$, —$OR_6$, —$CO_2R$, and halogen; wherein $R_6$ represents a straight or branched chain hydrocarbyl radical which contains one to four carbon atoms.

The term "halogen" includes bromine, chlorine, fluorine and iodine. The term "$C_5$–$C_7$-cycloalkyl" means a cyclic saturated hydrocarbon radical which contains five to seven carbon atoms. The term "$C_3$–$C_8$-alkenyl" is used to indicate an aliphatic hydrocarbon moiety having 3–8 carbon atoms and which contains at least one carbon-carbon double bond. The term "aryl" as used herein includes phenyl and phenyl substituted with one to 3 groups selected from $C_1$–$C_6$-alkyl, $C_1$–$C_6$-alkoxy, halogen, trifluoromethyl, carboxy, cyano, $C_1$–$C_6$-alkythio, $C_1$–$C_6$-alkylsulfonyl, hydroxy, $C_2$–$C_6$-alkanoyloxy, $C_2$–$C_6$-alkoxycarbonyl, $C_2$–$C_6$-alkanoylamino and $C_5$–$C_7$-cycloalkyl.

The term "heteroaryl" is used to include benzothiazol-2-yl, benzoxazol-2-yl, benzimidazol-2-yl, 1,3,4-thiadiazolyl-2-yl, triazolyl, thiazol-2-yl, thienyl, furyl, pyrrolyl, pyrimidinyl, pyridyl and the like and these substituted with one to two groups selected from $C_1$–$C_6$-alkyl, $C_1$–$C_6$-alkoxy, halogen, cyano, $C_2$–$C_6$-alkoxycarbonyl, carboxy, $C_1$–$C_6$-alkylthio, $C_1$–$C_6$-alkylsulfonyl, aryl, aryloxy, arylthio and arylsulfonyl.

The term "polyester reactive group" is used herein to describe a group which is reactive with at least one of the functional groups from which the polyester is prepared under polyester forming conditions. Examples of such groups are hydroxy, carboxy, $C_2$–$C_6$-alkanoyloxy, $C_2$–$C_6$-alkoxycarbonyl, $C_2$–$C_6$-alkoxycarbonyloxy and the like.

The preferred thermoplastic, amber, molding compositions of the present invention comprise a polyester having an inherent viscosity of about 0.6 to 0.9 dL/g comprising:
(1) diacid residues comprised of at least about 85 mole percent terephthalic acid residues, 2,6-naphthalenedicarboxylic acid residues, or a mixturee of terephthalic acid and 2,6-naphthalenedicarboxylic acid residues; and
(2) diol residues comprising at least about 50 mole percent, preferably at least 85 mole percent, ethylene glycol residues;

having copolymerized therein or reacted therewith:
(1) about 115 to 4500 ppm of residues of a compound of formula I:

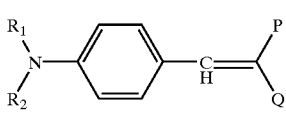

wherein $R_1$ and $R_2$ are methyl or ethyl; and P and Q are selected from $C_2$–$C_6$-alkoxylcarbonyl, $C_1$–$C_6$-alkylsulfonyl, arylsulfonyl, carbamyl, N—$C_1$–$C_6$-alkyl-carbamyl, N-arylcarbamyl and heteroaryl;

(2) about 190 to 7500 ppm of residues of a compound of formula I:

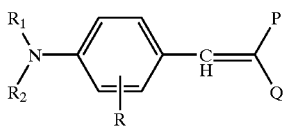

wherein R is hydrogen or methyl; $R_1$ and $R_2$ are selected from methyl, ethyl, n-propyl, 2-hydroxyethyl, 2-chloroethyl, 2-cyanoethyl, —$CH_2C_6H_5$, —$CH_2C_6H_4$-4-$CO_2$ $C_1$–$C_6$-alkyl and 2-$C_2$–$C_6$-alkanoyloxyethyl; P is cyano; and Q is selected from cyano, $C_2$–$C_6$-alkoxylcarbonyl, $C_1$–$C_6$-alkylsulfonyl, arylsulfonyl, carbamyl, N—$C_1$–$C_6$-alkylcarbamyl, N-arylcarbamyl and heteroaryl;

(3) about 565 to 22,500 ppm of residues of a compound of formula II:

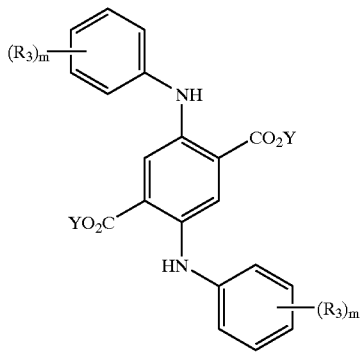

wherein Y is hydrogen, methyl, ethyl or 2-hydroxyethyl; $R_3$ is selected from hydrogen, methyl, methoxy and chlorine; and m is 1 or 2;

(4) about 300 to 12,000 ppm of residues of a compound of formula III:

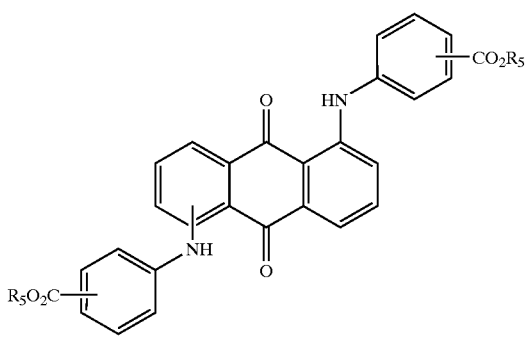

wherein $R_5$ is hydrogen or $C_1$–$C_6$-alkyl; and
(5) and having admixed therein about 50–1800 ppm of copper phthalocyanine blue colorant.

EXAMPLES

The present invention is further illustrated by the following example of a preferred embodiment, although it will be understood that this example is included merely for purposes of illustration and is not intended to limit the scope of the invention unless otherwise specifically indicated.

Example 1

The following materials were placed in a 500 mL, three-necked, round-bottom flask:
97.0 g (0.50 mol) dimethyl terephthalate
61.5 g (0.99 mol) ethylene glycol
1.12 g (0.0078 mol) 1,4-cyclohexanedimethanol
0.23 mL of a solution of titanium tetraisopropoxide in n-butanol {0.0256 g Ti[OCH(CH$_3$)$_2$]$_4$]/mL of solution}
3.03 mL of a solution of antimony triacetate in ethylene glycol [0.797 g Sb(OAc)$_3$/mL of solution]
0.029 g (300 ppm) diethyl {[(4-dimethylamino)phenyl] methylene} propenedioate (UV-light absorber of Example 2 of U.S. Pat. No. 4,617,373, formula I–R=H, n=1, $R_1$=$R_2$=—CH$_3$, P=Q=—COOC$_2$H$_5$)
0.048 g (500 ppm) methyl 3-{4-[[—N,N-bis-2-(acetoxyethyl)amino]-2-methylphenyl] methylene}-2-cyano-2-propenoate (yellow colorant of Example 17 of U.S. Pat. No. 3,617,373,—formula I—R=CH$_3$, n=1, $R_1$=$R_2$=CH$_3$COOCH$_2$CH$_2$—, P=CN, Q=—COOCH$_3$)
0.145 g (1500 ppm) 2,5-dianilinoterephthalic acid (orange colorant as disclosed in U.S. Pat. No. 4,745,173—formula II—$R_3$=Y=H, m=1)
0.77 g (800 ppm) 1,5-bis-(2-carboxyanilino) anthraquinone (red colorant of Example 2 of U.S. Pat. No. 4,359,570—formula III—$R_4$=H, n=1,—COOR$_5$=2-COOH)
0.012 g (125 ppm) copper phthalocyanine (C.I. Pigment Blue 15)

The flask was equipped with a nitrogen inlet, stirrer, vacuum outlet and condensing flask. The flask and contents were stirred and heated in a Belmont metal bath for about 1.0 hour at 200° C. The temperature was increased to about 210° C. over about 10 minutes and then held at 210° C. for about 65 minutes with a nitrogen sweep over the reaction mixture. The temperature was increased to about 265° C. over 30 minutes and then 0.42 mL of an ethylene glycol solution of a mixed phosphorous ester composition (Merpol A)(0.0914 g Merpol A/mL of solution) was added. The pressure was reduced from atmospheric to about 120 torr over 5 minutes and held for 50 minutes. Polycondensation was completed by increasing the temperature to about 285° C., reducing the pressure to about 8 torr over 5 minutes, holding at this temperature and pressure for about 25 minutes, reducing the pressure to about 0.5 torr over about 1 minute and holding for 20 minutes. The flask was removed from the metal bath and was allowed to cool in a nitrogen atmosphere. The resulting amber polyester had an inherent viscosity of 0.705 as measured in a 60/40 ratio by weight of phenol/tetrachloroethane at a concentration of 0.5 g per 100 mL.

After grinding the polymer in a Wiley mill and passing the solid through a 3 mm screen, a 15 mil film was prepared by compression molding a portion of the amber polyester composition. The transmission spectrum of the film is provided in FIG. I, which shows that excellent blockage of UV and visible light was achieved over the desired range of wavelengths from 320–550 nm using a Perkin Elmer Lambda 6 UV-Vis spectrometer.

Comparative Example 1

The amber polyester formulation disclosed in Example 761 of U.S. Pat. No. 4,617,373 was prepared by using the following procedure:
The following material were placed in a 500 mL, three-necked, round-bottom flask:
97.0 g (0.5 mol) dimethyl terephthalate 62.0 g (1.0 mol) ethylene glycol 0.0467 g (484 ppm) of yellow colorant used in Example 761 of U.S. Pat. No. 4,617,323

0.0216 g (225 ppm) of red colorant used in Example 761 of U.S. Pat. No. 4,617,323

0.0046 g (47 ppm) copper phthalacyanine (C.I. Pigment Blue 15)

2.9 mL of a solution of titanium tetraisopropoxide in n-butanol [0.0030 g $Ti[OCH(CH_3)_2]_4$]/mL of solution]

The flask was equipped with a nitrogen inlet, stirrer, vacuum outlet and condensing flask. The mixture was heated and stirred at about 200° C. at atmospheric pressure for about 1.0 hour using a Belmont metal bath. The reaction temperature was then increased to about 210° C. over about 5 minutes and held at 210° C. for about 90 minutes. Over about 20 minutes, the temperature was increased to about 280° C. Nitrogen flow was stopped and vacuum was applied to decrease the pressure to about 100 torr over about 5 minutes. The polycondensation was completed by reducing the pressure to about 0.5 torr over about 5 minutes and heating at about 280° C. for 1.0 hour. After cooling, the amber colored polyester was ground using a Wiley mill to pass through a 3 mm screen. A 15 mil film was prepared from a portion of the ground polyester material by compression molding. The UV-visible light transmission spectrum is provided of the film in FIG. II, which shows that the formulation provides poor absorption of light, particularly in over the wavelength ranges of about 325–400 nm and 455–550 nm and would not be suitable for packaging materials where the blockage of UV and visible light is critical.

In the specification there have been disclosed typical preferred embodiments of the invention and, although specific terms are employed, they are used in a generic and descriptive sense only and are not for purposes of limitation, the scope of the invention being set forth in the following claims.

We claim:

1. A molding grade amber composition comprising a thermoplastic polyester having copolymerized therein or reacted therewith residues of at least two compounds of formula I, at least one compound of formula II, and at least one compound of formula III:

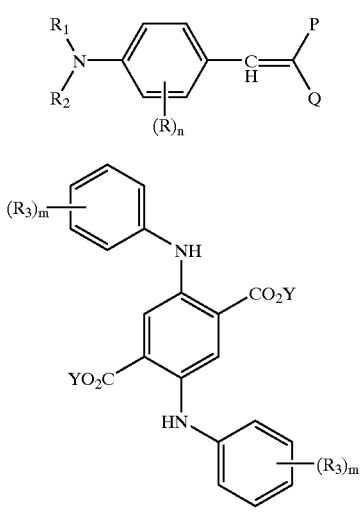

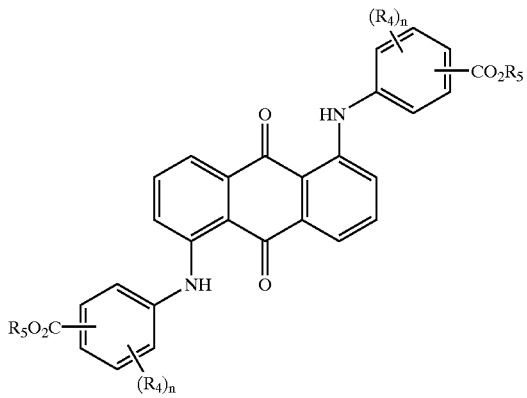

wherein:

R is selected from hydrogen, fluorine, chlorine, bromine, trifluoromethyl, $C_1$–$C_6$-alkyl and $C_1$–$C_6$-alkoxy;

$R_1$ and $R_2$ are independently selected from $C_1$–$C_8$-alkyl; $C_1$–$C_8$-alkyl substituted with one or two groups selected from hydroxy, cyano, $C_1$–$C_6$-alkoxy, $(OCH_2CH_2)_{1-3}$—O $C_1$–$C_6$-alkoxy, carboxy, halogen, $C_5$–$C_7$-cycloalkyl, $C_2$–$C_6$-alkoxycarbonyl, $C_2$–$C_6$-alkanoyloxy, aroyloxy, $C_2$–$C_6$-alkoxycarbonyloxy, heteroarylthio, aryloxy, arylthio, N-arylcarbamyloxy and aryl; $C_3$–$C_8$-alkenyl; $C_5$–$C_7$-cycloalkyl; aryl; $R_1$ and $R_2$ in combination may be a single group such as pentamethylene, ethyleneoxyethylene or ethylenesulfonylethylene; $R_1$ and $(R)_n$ in combination may be a trimethylene group optionally substituted with one or two $C_1$–$C_8$-alkyl groups which with the benzene ring to which R is attached forms a 1,2,3,4-tetrahydroquinoline radical; or $R_1$ may represent the radical:

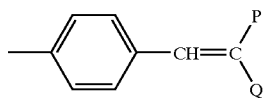

wherein P and Q are defined below;

P and Q are independently selected from cyano, aryl, $C_2$–$C_6$-alkoxycarbonyl, $C_1$–$C_6$-alkylsulfonyl, arylsulfonyl, carbamyl, N—$C_1$–$C_6$-alkylcarbamyl, N-arylcarbamyl and heteroaryl;

$R_3$ is selected from hydrogen, $C_1$–$C_6$-alkyl, $C_1$–$C_6$-alkoxy, aryl, cyclohexyl, aryloxy, arylthio, $C_2$–$C_6$-alkoxycarbonyl, trifluoromethyl, hydroxy, $C_2$–$C_6$-alkanoyl-amino, aroylamino and halogen;

Y is selected from hydrogen, $C_1$–$C_6$-alkyl, aryl, $C_5$–$C_7$-cycloalkyl, —$CH_2$-1,4-cyclohexylene-$CH_2OH$, $(CH_2CH_2O)_{1-2}$ $CH_2CH_2OH$; $C_3$–$C_7$-alkenyl, and furfuryl;

$R_4$ is selected from hydrogen, $C_1$–$C_6$-alkyl, $C_1$–$C_6$-alkoxy or halogen;

$R_5$ is selected from hydrogen or one of the groups which Y may represent;

m is 1, 2, or 3; and n is 1 or 2;

provided that at least one polyester reactive group be present on the compound of formulas I, II and III; and wherein the concentration of the copolymerized compounds is sufficient that a film of the polyester composition having a thickness of from about 25 to 1016 microns (about 1 to 40 mil) transmits no more than an average of about 3% of ultraviolet and visible light over the wavelength range from about 300 to 450 nm, no more visible light than an average of about 7% over the 450 to 500 nm wavelength range and no more visible light than an average of about 15% over the range of from about 500 to 550 nm; and wherein about 50–200 ppm of copper phthalocyanin e blue colorant is admixed in the thermoplastic polyester.

2. The composition of claim 1 containing the copolymerized residues of compounds of Formula I, II and III at such levels that a film having a thickness of from about 76 to 432 microns (about 3 mil to 17 mil) will transmit no more than an average of about 1% of ultraviolet and visible light over the wavelength range from about 300 nm to about 450 nm, no more visible light than an average of about 3% of the visible light over the wavelength range of about 450 nm to about 500 nm and no more visible light than about 10% over the range of from about 500 nm to about 550 nm.

3. The polymeric composition of claim 2 wherein the polyester is comprised of:
    (1) diacid residues comprised of at least about 85 mole percent terephthalic acid residues; and
    (2) diol residues comprising at least about 85 mole percent ethylene glycol residues.

4. The polymeric composition of claim 2 wherein the polyester is comprised of:
    (1) diacid residues comprised of at least about 85 mole percent 2,6-naphthalene-dicarboxylic acid residues; and
    (2) diol residues comprising at least about 85 mole percent ethylene glycol residues.

5. The composition of claim 1 wherein compounds of Formula I correspond to the structures wherein: (1) $R_1$ and $R_2$ are methyl or ethyl, $(R)_n$ is hydrogen and P and Q are $C_2$–$C_6$-alkoxycarbonyl and (2) $R_1$ and $R_2$ are selected from methyl, ethyl, n-propyl, 2-hydroxyethyl, 2-cyanoethyl, —$CH_2C_6H_5$, —$CH_2C_6H_4$-4-$CO_2C_1$–$C_6$ alkyl and 2-$C_2$–$C_6$ alkanoyloxyethyl, P is cyano, and Q is $C_2$–$C_6$-alkoxycarbonyl; the compounds of Formula II which correspond to the structures wherein Y is hydrogen, methyl or 2-hydroxyethyl and $(R_3)_m$ is hydrogen or one or two groups selected from methyl, methoxy and chlorine; the compounds of Formula III correspond to the structures wherein $(R_4)_n$ is hydrogen and $R_5$ is hydrogen or $C_1$–$C_6$ alkyl.

6. The polymeric composition of claim 1 wherein the polyester comprises at least 50 mole percent of the residues of terephthalic acid and 50 mole percent of the residues of ethylene glycol.

7. The polymeric composition of claim 1 wherein the polyester comprises at least 50 mole percent of 2,6-naphthalenedicarboxylic acid residues and at least 50 mole percent of the residues of ethylene glycol.

8. A thermopastic, amber, molding composition comprising a polyester having an inherent viscosity of about 0.6 to 0.9 dL/g comprising:
    (1) diacid residues comprised of at least about 85 mole percent terephthalic acid residues, 2,6-naphthalenedicarboxylic acid residues, or a mixture of terephthalic acid and 2,6-naphthalenedicarboxylic acid residues; and
    (2) diol residues comprising at least about 50 mole percent, preferably at least 85 mole percent, ethylene glycol residues;
having copolymerized therein or reacted therewith:
    (1) about 115 to 4500 ppm of residues of a compound of formula I:

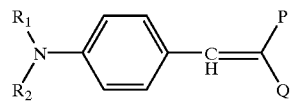

wherein $R_1$ and $R_2$ are methyl or ethyl; and P and Q are selected from $C_2$–$C_6$-alkoxylcarbonyl, $C_1$–$C_6$-alkylsulfonyl, arylsulfonyl, carbamyl, N—$C_1$–$C_6$-alkyl-carbamyl, N-arylcarbamyl and heteroaryl;
    (2) about 190 to 7500 ppm of residues of a compound of formula I:

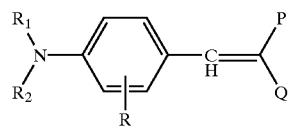

wherein R is hydrogen or methyl; $R_1$ and $R_2$ are selected from methyl, ethyl, n-propyl, 2-hydroxyethyl, 2-chloroethyl, 2-cyanoethyl, —$CH_2C_6H_5$, —$CH_2C_6H_4$-4-$CO_2$ $C_1$–$C_6$-alkyl and 2-$C_2$–$C_6$-alkanoyloxyethyl; P is cyano; and Q is selected from $C_2$–$C_6$-alkoxylcarbonyl, $C_1$–$C_6$-alkylsulfonyl, arylsulfonyl, carbamyl, N—$C_1$–$C_6$-alkylcarbamyl, N-arylcarbamyl and heteroaryl;
    (3) about 565 to 22,500 ppm of residues of a compound of formula II:

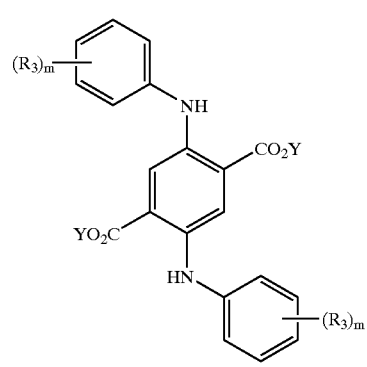

wherein Y is hydrogen, methyl, ethyl or 2-hydroxyethyl; $R_3$ is selected from hydrogen, methyl, methoxy and chlorine; and m is 1 or 2;
    (4) about 300 to 12,000 ppm of residues of a compound of formula III:

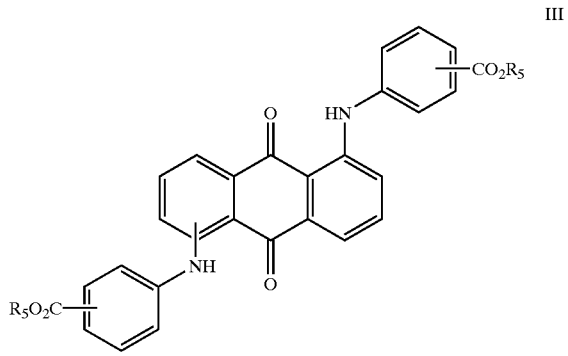

wherein $R_5$ is hydrogen or $C_1$–$C_6$-alkyl; and
    (5) and having admixed therein about 50–1800 ppm of copper phthalocyanine blue colorant.

* * * * *